US007804824B2

(12) United States Patent
Andrews

(10) Patent No.: US 7,804,824 B2
(45) Date of Patent: *Sep. 28, 2010

(54) METHOD AND SYSTEM FOR OPERATING A FIELD PROGRAMMABLE LINE CARD USING A COUNTRY CODED TEMPLATE

(75) Inventor: Jeffrey S. Andrews, Norcross, GA (US)

(73) Assignee: ARRIS Group, Inc., Suwanee, GA (US)

( * ) Notice: Subject to any disclaimer, the term of this patent is extended or adjusted under 35 U.S.C. 154(b) by 361 days.

This patent is subject to a terminal disclaimer.

(21) Appl. No.: 11/334,284

(22) Filed: Jan. 18, 2006

(65) Prior Publication Data

US 2006/0126607 A1    Jun. 15, 2006

(51) Int. Cl.
*H04M 3/00* (2006.01)
(52) U.S. Cl. .............. 370/359; 455/432.2; 455/435.2; 455/552.1; 455/419; 455/466; 370/352; 379/221.14
(58) Field of Classification Search .............. 455/414.2, 455/414.1, 418–420, 432.1–435.3, 552.1, 455/456.1; 379/399.01–413, 221.14; 370/463, 370/359, 352, 401; 709/203–206
See application file for complete search history.

(56) References Cited

U.S. PATENT DOCUMENTS

| | | | | |
|---|---|---|---|---|
| 4,481,574 A * | 11/1984 | DeFino et al. | ............ | 379/93.01 |
| 5,333,185 A * | 7/1994 | Burke et al. | ............ | 379/127.01 |
| 5,712,977 A * | 1/1998 | Glad et al. | .................... | 710/10 |
| 5,732,349 A * | 3/1998 | Sanpei et al. | ............ | 455/435.1 |
| 5,828,959 A * | 10/1998 | Soderbacka | .................. | 455/445 |
| 5,862,481 A * | 1/1999 | Kulkarni et al. | .......... | 455/432.2 |
| 5,878,124 A * | 3/1999 | Griesmer et al. | ....... | 379/357.01 |
| 5,937,053 A * | 8/1999 | Lee et al. | ............... | 379/221.14 |
| 5,999,811 A * | 12/1999 | Molne | ..................... | 455/432.3 |
| 6,049,712 A * | 4/2000 | Wallinder | .................... | 455/410 |
| 6,085,110 A * | 7/2000 | Nilsson | .................. | 455/552.1 |
| 6,128,373 A * | 10/2000 | Mathe et al. | ............. | 379/93.29 |
| 6,185,729 B1* | 2/2001 | Watanabe et al. | .......... | 717/100 |
| 6,201,860 B1* | 3/2001 | Kullstrom et al. | ...... | 379/201.01 |
| 6,282,574 B1* | 8/2001 | Voit | ........................... | 709/230 |
| 6,310,948 B1* | 10/2001 | Nemeth | ................... | 379/213.01 |
| 6,311,190 B1* | 10/2001 | Bayer et al. | ........................ | 1/1 |
| 6,363,431 B1* | 3/2002 | Hammer et al. | ............. | 709/249 |
| 6,470,447 B1* | 10/2002 | Lambert et al. | ............. | 713/151 |
| 6,487,405 B1* | 11/2002 | Dapper | ....................... | 455/424 |
| 6,643,511 B1* | 11/2003 | Rune et al. | .................. | 455/433 |
| 7,024,185 B2* | 4/2006 | Andrews | .................... | 455/419 |
| 7,083,095 B2* | 8/2006 | Hendrick | .................... | 235/451 |
| 7,606,581 B2* | 10/2009 | Riise et al. | ............... | 455/456.1 |
| 2004/0077359 A1* | 4/2004 | Bernas et al. | ............ | 455/456.1 |
| 2005/0101323 A1* | 5/2005 | De Beer | ................. | 455/435.2 |
| 2005/0163125 A1* | 7/2005 | Epley | ...................... | 370/395.1 |
| 2007/0293216 A1* | 12/2007 | Jiang | .......................... | 455/433 |

* cited by examiner

*Primary Examiner*—Sharad Rampuria
(74) *Attorney, Agent, or Firm*—Troy A. Van Aacken; Robert J. Starr

(57) ABSTRACT

A database correlating a specific set of linecard criteria, out of a plurality of sets of linecard criteria, to a template code is loaded into a linecard during manufacturing. A template code based on country-specific criteria is sent to the linecard at startup, whenever otherwise desired. The template code may also be periodically refreshed from a central authority that recognizes the address of a particular linecard.

15 Claims, 2 Drawing Sheets

METHOD AND SYSTEM FOR OPERATING A FIELD PROGRAMMABLE LINE CARD USING A COUNTRY CODED TEMPLATE

CROSS REFERENCE TO RELATED APPLICATION

This application claims priority under 35 U.S.C. sec. 120 to U.S. patent application Ser. No. 10/272,414 entitled "Method And System For Operating a Field Programmable Line Card Using a Country Coded Template", which is incorporated herein by reference in its entirety.

FIELD OF THE INVENTION

This invention relates, generally, to communication networks and, more particularly, a linecard used in communications network that is field-programmable for use in different countries having different network linecard load register values.

BACKGROUND

Currently, broadband networks may be used to provide traditional telephony service over community antenna television ("CATV") or other communications networks using coaxial cable ("coax") or optical fiber cable. For example, ARRIS™ International, Inc. offers a telephony over cable product known as Cornerstone™, which incorporates linecards that provide an interface for connecting subscriber lines to the Cornerstone™ product, and hence, the rest of the network. Products, such as those in the Cornerstone™ line, may typically be used in more than one country.

However, different countries may have different network design specifications and/or operating requirements. For example, telephony networks in Germany typically operate at a ringing frequency of 25 Hz, whereas networks in neighboring France and Austria typically operate at a ringing frequency of 50 Hz. Thus, equipment to be used in different countries is configured for the network operating environment in which it will be used. Accordingly, equipment hardware is often configured at the manufacturing plant or before installation, and custom software is shipped for a particular network's requirements.

Although configuring the linecards before installation is acceptable from a performance and operation standpoint, the cost of the linecards is higher because of the customized nature of the manufacturing and shipping processes. In addition, for some network operators that may serve multiple countries, costs and inconvenience are increased because equipment configured for one country may not work in another country, and thus extra equipment must be ordered and stored. If an operator desires to have extra equipment in stock for network expansion and/or maintenance purposes, and the operator has a network in France and another in Germany, for example, twice as much hardware would have to bought and stored, or at the least, different software would have to be maintained and managed for the two different countries.

Therefore, there is a need for a method and system for manufacturing and operating network equipment that can be integrated into a variety of different countries without the need to manufacture the equipment differently for use in different countries.

Furthermore, there is a need for a method and system for easily configuring, broadband network equipment that provides telephony service in different countries after the equipment has been installed in a network without the need for field personnel at a linecard.

SUMMARY

It is an object to provide a method and system for accessing linecard register values associated with a particular country's network design specifications stored in a database indexed by template code.

It us another object to provide universal linecard equipment that can remotely access a template code database based on the address of the linecard.

A database comprising a unique identifier for each of a plurality of countries is provided. The database is indexed by unique identifier and each identifier is associated with one of a plurality of different template codes, where each template code corresponds to one of a plurality of sets of network operating specifications. Some countries may use more than one set of operating specifications. However, the template code is sent to a give linecard based on a pre-configured table that associates a particular linecard addresses with a particular country.

The template code database may be accessed by the linecard in a number of ways, including marshalling in to a central authority using a soft dial tone signal. Operating specification parameters that do not vary with respect to country may be permanently loaded during manufacture or at initial bootup, and are typically not included in the country-specific specification database.

DETAILED DESCRIPTION

As a preliminary matter, it will be readily understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The following disclosure is not intended nor is to be construed to limit the present invention or otherwise to exclude any such other embodiments, adaptations, variations, modifications and equivalent arrangements, the present invention being limited only by the claims appended hereto and the equivalents thereof. Furthermore, while some aspects of the present invention are described in detail herein, no card type, fiber or cable type, integrated circuit, connector, enclosure, power supply, operating system, or circuit board arrangement, for example, is required to be used in the practicing of the present invention. Indeed, selection of such parts and components would be within the routine functions of a designer skilled in the art.

Figure 1:
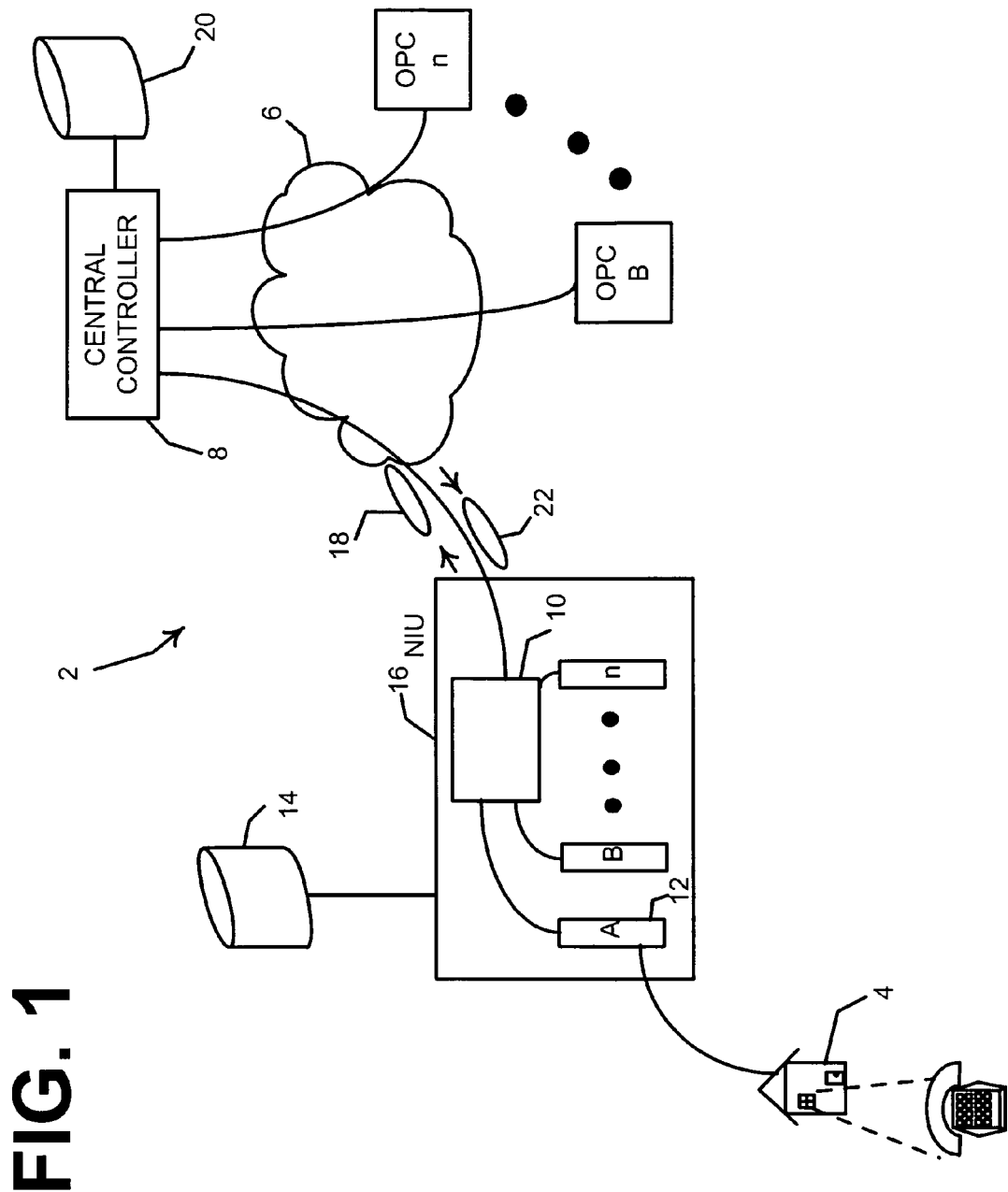
FIG. 1 illustrates a network architecture for implementing the invention.

Turning now to the figures, FIG. 1 illustrates a system 2 for providing telephony services to a plurality of subscribers 4 using a broadband communications network 6. A centralized authority ("CA") 8, such as a headend or central office, manages and controls the services provided to the subscribers 4. The CA 8 may manage services for an area that may be as large as an entire continent, or possibly the entire world, but typically manages a smaller area, for example, a state within the United States, or a large metropolitan area.

Network 6 may use Ethernet technology, as well as other networking technologies known in the art, to provide high bandwidth transport functionality. Network 6 may comprise a hybrid network infrastructure known in the art as hybrid fiber coax ("HFC") that partly uses optical fiber and partly uses coaxial cable, such as typically used in community antenna television systems ("CATV"), to provide the transport medium of network. The operating transport technology may use CATV or a cable modem termination system ("CMTS"), as well as other techniques known in the art.

Within the hierarchy of network system 2, a plurality of operations controllers ("OPC") 10 facilitates distribution to the various subscriber premise equipment 4 served by the provider/operator of CA 8. An OPC may typically include software and hardware means for regulating and routing of traffic flow for a number of devices, such as linecards, or other OPC device. Thus, it will be appreciated by those skilled in the art that for simplicity of the description herein, each OPC 10 shown may comprise more than one layer in the hierarchy of network 2, where each layer may be a hub or a node, for example. For clarity, these components have been represented as a single block in the figure. Each hub or node may have its own operations controller, for controlling data traffic flow by and between the various components that make up the network. Thus, when referring to OPC 10 (of which there will typically be a plurality in any given network, each serving a plurality of subscribers), it will be appreciated that multiple components, including software and hardware, are being referenced.

At the distribution component closest (electrically or optically, but not necessarily physically) to a particular subscriber 4, an individual linecard 12 typically exists for each subscriber. However, some network equipment may be designed having more than one port per linecard 12, thereby requiring less physical rack or shelf space at a particular location. In addition, multiple line cards may not physically correlate to multiple, respective, individual cards. The functionality of multiple linecards may be enclosed in a single housing, although separate subscriber interface chipsets will typically exist for each subscriber 4 served. Regardless of the physical configuration, each subscriber 4 typically connects to a dedicated port, with each port capable of having configured for a unique address. It will be appreciated that at each subscriber location, be it a residential house, apartment or a commercial establishment, a subscriber premise equipment unit will exist, typically on the side of the building. Each of these subscriber premise equipment units is in communication with the linecard 12, or equivalent circuitry, via the dedicated port mentioned above.

The OPC 10 controls the signaling and data/message flow between the linecards 12 and the rest of the network 2. For example, the OPC 10 may control the sending and receiving of signals to the linecards 12 where the network node or hub, for example, uses a time scheduling scheme to provide downstream narrowcasting or upstream broadcasting services. In addition, the OPC 10 may route soft dial tone or fully provisioned dial tone to a particular network interface unit. In addition, the OPC 10 may recognize the status of a particular linecard 12 and transmit the same as a message to the next higher component layer in the network. The status, or state, levels of the subscriber line may include an out-of-service signal and an in-service signal channel. These signal channels can be used to transport a variety of information.

The channel used for the out-of-service signal can be used to send an information request by removing linecard 12 from service with an out of service command, sending a command to CA 8 requesting information, sending the requested information from the CA, and then sending an in service command to place the line card back in service after the requested information has been sent from the CA. The particular information sent from the linecard 12 to the CA 8 may include a command requesting that a template code be refreshed from the CA. These template codes typically correspond to a set of operating criteria, which may also be referred to as linecard register values, and include data corresponding to such parameters as: input impedence, balance impedence, A-D gain at 1004 Hz, D-A gain at 1004 Hz, D-A long distance per call adjustments, PCM encoding rules, equalization loss, on/offhook threshold amps, current limiting limit and ringing frequency, among other parameters.

Since the telephony systems of different countries typically have different linecard register values, a particular linecard 12, or group of linecards, served by a given node, or hub (either or both represented by OPC 10 as discussed above), for example, should be programmed according to the network in which it will be operating. Instead of customizing a particular linecard 12, or group of linecards, during manufacture, for a particular country, linecard register values for all countries may be stored in database 14 as an array. The array of database 14 may be included on each linecard 12 during manufacturing, or may be included as part of the equipment 16 that comprises the plurality of linecards 12, their corresponding OPC 10 and other hardware, such as a microprocessor and power supply, for example. The means at a given OPC unit that comprises the main brains of a system controlling multiple linecards may be referred to in the art as an Application Processor Unit ("APU"). Among other things, the APU may maintain the database array 14 and may provide a user interface. The collection of equipment 16 that includes all of these components is shown by a dashed line to indicate that table 14 may be shared by a group of linecards 12, or may be individually loaded on each linecard. The collection of equipment 16 may be referred to as a network interface unit for simplicity. Accordingly, a particular OPC 10 can send a request message 18 for linecard 12, or group of linecards served by a particular OPC 10, to CA 8 requesting that linecard register values be refreshed with current values.

To send a message requesting that refreshed register values be loaded to a requesting OPC 10, the OPC may use the channel for sending out-of-service signals to the CA 8. Thus, message 18 containing the command requesting that the register values be refreshed can use existing infrastructure, and can be piggy-backed with an out-of-service message sent from the OPC 10. CA 8 receives the incoming out-of-service signal and refresh message 18, and extracts the refresh message therefrom. The refresh message typically requests a template code corresponding to the particular country and country code (or other identifier of the location of system 2) in which the linecard 12 and corresponding OPC are being used.

The CA 8 determines the OPC 10 and linecard 12 from which refresh message 18 is received, based on an address. The address is typically provided to the CA 8 during startup of network 2 as part of an array that associates a template code with a linecard address. The template code corresponding to OPC 10/linecard 12 is retrieved from table 20 and sent back to the requesting OPC 10 (or combined equipment 16). The values retrieved from table 20 may be sent back as a template code message 22 along with an in-service message. The template code contained in the template message 22 is then loaded into the OPC 10 and/or into the particular linecards 12 served by the OPC. It will be appreciated that all linecards 12 served by a given OPC are provisioned with the same register values. However, since each linecard 12 can be addressed individually, each linecard 12 served by a given OPC may be configured differently from the next.

OPC 10, or linecard 12, uses the information received in the template code message 22 to retrieve a set of linecard register values that corresponds to the template code. The template code message 22 is typically a two-byte message that represents a particular set of register values to use. A plurality of register value sets are stored in database 14, which is indexed by template code. Thus, the OPC 10/linecard 12, or more generally, combined components represented by reference numeral 16, can retrieve the appropriate set of country-specific register values to use based on the code received in template message 22. Accordingly, a technician does not have to manually provision each line card upon startup, thereby reducing the man-hours and possibility of errors at startup.

Figure 2:
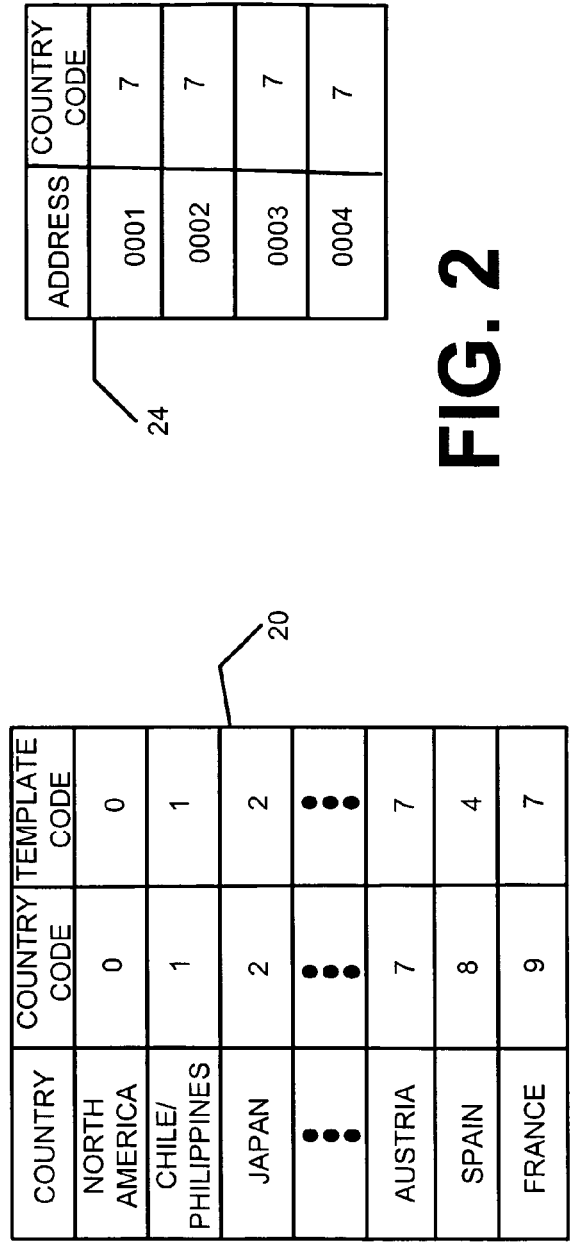
FIG. 2 illustrates a linecard register value database array, a template code database array and a country code array.

Turning now to FIG. 2, the database tables that may be used to implement an aspect are illustrated. Table 20 shows that, in addition to merely using a country code to determine the appropriate set of register values to be used for a particular linecard 12 (shown in FIG. 1), a plurality of country codes may correlate to a plurality of template codes. In such a scenario, there may typically be fewer different template codes than there are country codes. This is because the standards of more than one country may use the same set of register values to implement networks within the respective countries. For example, for seamless telephony service between Canada and the United States, both may use an identical set of register values. As shown in table 20, Austria and France, while each having unique country codes, share the same template code. This is because both countries use the same criteria, or linecard register values to operate telephony networks. It will be appreciated that the tables shown in the figure are for purposes of example, and that a typical table 20 will comprise more than just nine different country codes and in addition, and similarly with respect to table 14, will comprise more than just seven template codes. Furthermore, the array of various register values corresponding to the different template codes is given for purposes of example, and is not meant to indicate, or otherwise limit, the actual types of parameters or corresponding register values that may be used in a given system.

Thus, for example, a linecard or OPC may be configured with the array of information as shown in table 14. If a CA receives a refresh request, the CA can determine from which country the request was received by looking up in a table similar to table 24, which associates linecard address with country code. Then, based on the country code determined from table 24, the appropriate template code from table 20 can be determined and sent back to the requesting linecard, OPC or combined equipment device at the addressed from which the corresponding refresh request message was received. In the example shown in the figure, if a template code request is received from a linecard having address "0001", the CA could determine country code "7" from table 24, and in turn, determine from table 20 that template code "7" should be returned to the requesting entity. The requesting entity, whether a sole linecard, an OPC serving multiple linecards, or a combined equipment device (including an OPC and multiple linecards, but having a single micro processor, for example) can provision itself by using the returned template code to retrieve the corresponding set of register values from table 14.

What is claimed is:

1. A system for programming a linecard configured with a plurality of sets of line interface specification values in a communications network providing telephony services comprising:
 a database including, and indexed on, a plurality of template codes, and a plurality of sets of linecard register values, each of the plurality of template codes being associated with one of the plurality of sets of line interface specification values;
 a messaging means for requesting a template code from a central controller, the central controller being operable to send the requested template code to a requesting device;
 a means for determining the template code based on the address of the device requesting the template code; and
 a means for determining a desired set of line interface specification values from the database based on the template code sent from the central controller.

2. A system for programming line interface equipment with one of a plurality of sets of line interface specification values, comprising:
 a central controller;
 means for storing a county code/address cross-reference database that associates a unique address of a network interface device with a country code, wherein said cross reference database is accessible by the central controller;
 means for storing a template code cross-reference database that associates a country code with a template code, wherein said template code cross reference database is accessible by the central controller;
 line interface equipment coupled to a plurality of subscriber devices, the line interface equipment capable of communicating with the central controller via a network; and
 means for storing a specification database that associates each of a plurality of template codes with a set of line interface register values, wherein said specification database is accessible by the central controller.

3. The system of claim 2 wherein the central controller is a host digital terminal.

4. The system of claim 2 wherein the central controller is a Packet Cable provisioning server.

5. The system of claim 2 wherein the line interface equipment includes a hub.

6. The system of claim 5 wherein the line interface equipment includes a node.

7. The system of claim 2 wherein the line interface equipment includes a node.

8. The system of claim 2 wherein the line interface equipment includes a line interface device corresponding to a subscriber.

9. The system of claim 2 wherein the county code/address cross-reference database is stored in a computer memory device.

10. The system of claim 2 wherein the template code cross reference database is stored in a computer memory device.

11. The system of claim 2 wherein the specification database is stored in a computer memory device.

12. The system of claim 2 wherein the address is an internet protocol address.

13. The system of claim 2 wherein the address is a Media Access Control address.

14. A method for programming line interface equipment with one of a plurality of sets of line interface specification values, comprising:

receiving a request message from one of a plurality of network interface devices, each of which is associated with a unique address;

determining from a country code/address cross reference database a country code that corresponds to the unique address;

determining from a template code cross-reference database one of a plurality of template codes that corresponds to the determined country code;

returning the template code that was determined to correspond to the determined country code to the requesting device;

determining from a specification database a set of line interface register values to load into the line interface equipment based on the returned template code; and loading into the line interface device the desired set of line interface register values that corresponds to the returned template code.

15. A method for programming line interface equipment with one of a plurality of sets of line interface specification values, comprising:

sending a request message from one of a plurality of network interface devices, each of which is associated with a unique address;

receiving a template code that was determined to correspond to the country code of the requesting device;

determining from a specification database a set of line interface register values to load into the line interface equipment based on the received template code; and loading into the line interface device the desired set of line interface register values that corresponds to the returned template code.

\* \* \* \* \*